United States Patent [19]

Taneda

[11] Patent Number: 4,990,738
[45] Date of Patent: Feb. 5, 1991

[54] WIRE ELECTRODE FEEDING DEVICE IN WIRE CUT ELECTRIC DISCHARGE MACHINE

[75] Inventor: Atsushi Taneda, Aichi, Japan

[73] Assignee: Mitsubishi Denki Kabushiki Kaisha, Tokyo, Japan

[21] Appl. No.: 457,797

[22] PCT Filed: Apr. 20, 1989

[86] PCT No.: PCT/JP89/00425
§ 371 Date: Feb. 27, 1990
§ 102(e) Date: Feb. 27, 1990

[87] PCT Pub. No.: WO89/11372
PCT Pub. Date: Nov. 30, 1989

[30] Foreign Application Priority Data

May 18, 1988 [JP] Japan ................ 63-121313

[51] Int. Cl.$^5$ .............................. B23H 7/10
[52] U.S. Cl. ..................... 219/69.12; 361/210
[58] Field of Search .......... 219/69.12, 69.13; 361/144, 210

[56] References Cited

U.S. PATENT DOCUMENTS

| | | | |
|---|---|---|---|
| 3,185,909 | 5/1965 | Jahn | 361/210 |
| 4,609,803 | 9/1986 | Inoue | 219/69.12 |
| 4,652,716 | 3/1987 | Schneider et al. | 219/69.12 |

FOREIGN PATENT DOCUMENTS

| | | | |
|---|---|---|---|
| 53-27193 | 3/1978 | Japan. | |
| 54-90691 | 7/1979 | Japan. | |
| 55-46807 | 11/1980 | Japan. | |
| 56-10130 | 3/1981 | Japan. | |
| 60-207726 | 10/1985 | Japan. | |
| 61-8225 | 1/1986 | Japan | 219/69.12 |
| 61-192468 | 8/1986 | Japan. | |

Primary Examiner—Geoffrey S. Evans
Attorney, Agent, or Firm—Sughrue, Mion, Zinn, Macpeak & Seas

[57] ABSTRACT

In a wire cut electric discharge machine, a plurality of magnetic field generating coils are arranged on the path along which a wire electrode is introduced into a workpiece, currents different in phase from one another are applied to the magnetic field generating coils thus arranged, so that the wire electrode is driven by the electromagnetic induction caused by the shifting magnetic fields which are produced by the magnetic field generating coils, whereby the wire electrode is smoothly fed without deformation. The leakage of magnetic flux is reduced by using a wire electrode made of magnetic material. The magnetic field generating coils are wound coaxial with the wire electrode, or they are provided so as to form magnetic fields perpendicular to the direction of insertion of the wire electrode, whereby the resultant wire electrode feeding device is simple in structure, but can produce a strong force of driving the wire electrode.

7 Claims, 8 Drawing Sheets

WIRE ELECTRODE FEEDING DEVICE IN WIRE CUT ELECTRIC DISCHARGE MACHINE

TECHNICAL FIELD

This invention relates to a wire electrode feeding device in a wire cut electric discharge machine which guides a wire electrode into a workpiece to be machined, and more particularly to an improvement of the automatic feeding of a wire electrode.

BACKGROUND ART

A wire cut electric discharge machine has been extensively employed in the art in which a wire electrode is allowed to penetrate a workpiece to be machined such as a hard metal workpiece with a small gap therebetween, and while the wire electrode and the workpiece are being moved relative to each other along a complicated machining locus, a machining voltage is applied across the wire electrode and the workpiece to cause electric discharge therebetween, so that the workpiece is accurately machined with the discharge energy.

With the wire cut electric discharge machine, it is necessary to penetrate the workpiece with the wire electrode, to machine it.

A wire electrode is, in general, a thin metal wire, and therefore it is rather difficult to manually penetrate the workpiece with the wire electrode. The wire electrode is often broken by the occurrence of abnormal conditions during machining. Whenever the wire electrode is broken, the operator is forced to perform the difficult operation of inserting a wire electrode into a workpiece.

For instance in a progressive cutting operation, a workpiece having a plurality of cutting parts which are separate from one another, after a part of the workpiece has been cut, the wire electrode must be removed therefrom and inserted into workpiece at the next cutting operation start point. This difficulty obstructs automation of a wire cut electric discharge machine, and greatly lower the machining efficiency thereof.

In order to overcome the drawback, a wire electrode feeding device has been proposed in the art in which a wire electrode is driven by means of rollers or belts so as to be automatically inserted into a hole formed in the workpiece.

The conventional wire electrode feeding device is as shown in FIG. 12. In FIG. 12, reference numeral 1 designates a wire electrode; 2, a pipe guide; 3 and 4, pairs of wire driving rollers; 5a and 5b, current supplying dies; 6, a workpiece; and 7 and 8, electric motors for driving the pairs of rollers 3 and 4, respectively.

The wire electrode 1 led to the rollers 3 is driven by the latter so that it is inserted into the pipe guide 2. The wire guide 1 thus inserted is introduced to the lower rollers 4 through the workpiece 6 and the current supplying dies 5a and 5b.

When the wire electrode 1 is broken during machining, the breakage occurs at its part between the two pairs of rollers 3 and 4. In this case, the wire electrode is driven by the pair of rollers 3 again so that it is inserted into the workpiece 6.

The conventional wire electrode supplying device in a wire cut electric discharge machine is constructed as described above. On the other hand, there has been a significant tendency to use thinner wire electrodes to accomplish a wire cut electric discharge machining operation with higher accuracy. A thin wire electrode is low in mechanical strength, and accordingly if it is held strongly with the pairs of rollers, then it may be deformed, which adversely affects the machining accuracy. In order to drive the thin wire electrode satisfactorily, the pair of rollers must be high in mechanical accuracy. In order to meet the requirement, the pairs of roller must be increased in size, and accordingly they must be positioned remoter from the workpiece, and the pipe guide disposed between the pair of rollers and the workpiece must be also lengthened as much. In inserting the flexible wire electrode into the pipe guide thus lengthened, a frictional force is produced between the wire electrode and the guide pipe; that is, it is rather difficult to smoothly insert the wire electrode into the pipe guide.

DISCLOSURE OF THE INVENTION

Accordingly, an object of this invention is to eliminate the above-described difficulties accompanying a conventional wire electrode feeding device in a wire cut electric discharge machine. More specifically, an object of the invention is to provide a wire electrode feeding device for a wire cut electric discharge machine in which electromagnetic induction is utilized to drive a thin wire electrode smoothly and positively without deforming it.

Another object of the invention is to provide a wire electrode feeding device simple in construction in which a great driving force is produced readily, the leakage of magnetic flux is minimized, whereby production of high magnetic flux and miniaturization of the device can be obtained at the same time.

In a wire cut electric discharge machine, a wire electrode feeding device, according to the invention, comprises: a plurality of magnetic field generating coils arranged on the path along which a wire electrode is introduced into a workpiece; and current supplying means for supplying currents different in phase from one another to the magnetic field generating coils.

The wire electrode is inserted into a pipe guide, and its is made of magnetic material so that it forms a part of the magnetic path. The magnetic field generating coils are wound coaxial with the wire electrode, or they are provided so as to form magnetic fields perpendicular to the direction of insertion of the wire electrode, or they are arranged in pair on both sides of the wire electrode so that each of the pairs of magnetic field generating coils form one and the same magnetic flux. The magnetic field generating coils may be tape-shaped ones which are formed by an optical method.

BEST MODE FOR CARRYING OUT THE INVENTION

Embodiments of this invention will be described with reference to the accompanying drawings.

Figure 1:
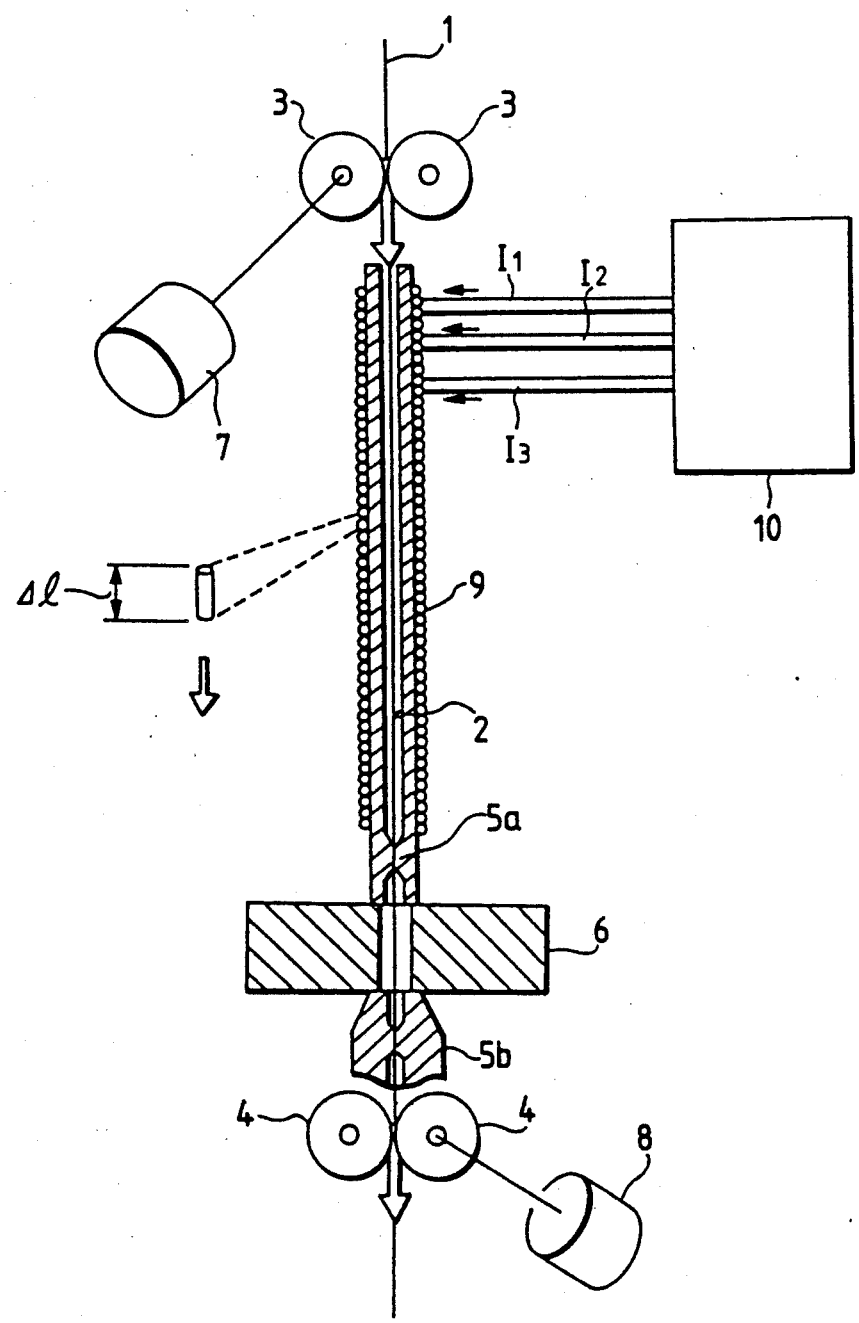
FIG. 1 is a diagram showing the arrangement of one example of a wire electrode feeding device according to this invention.
Figure 2:
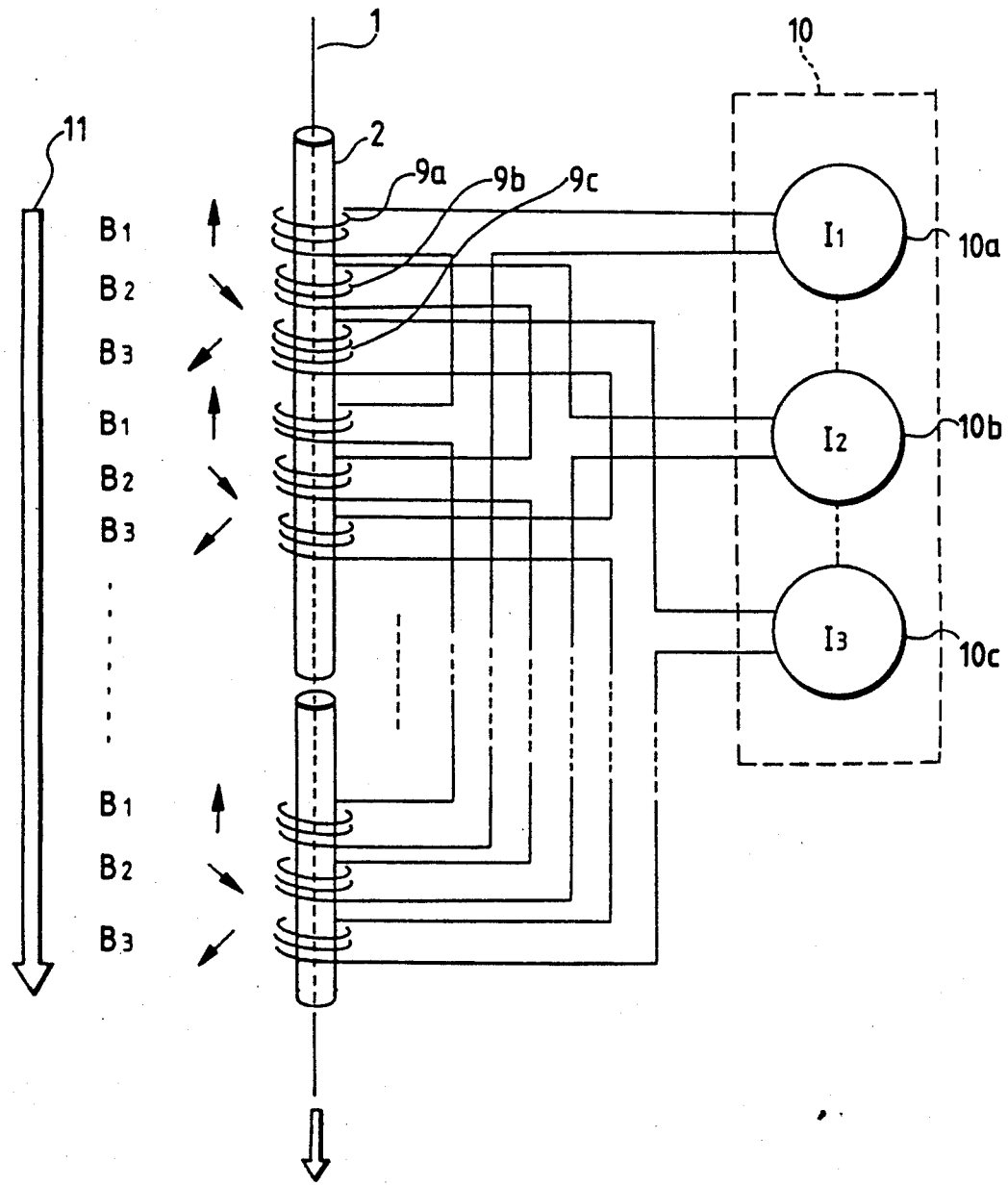
FIG. 2 is an enlarged view showing essential components of the device.
Figure 12:
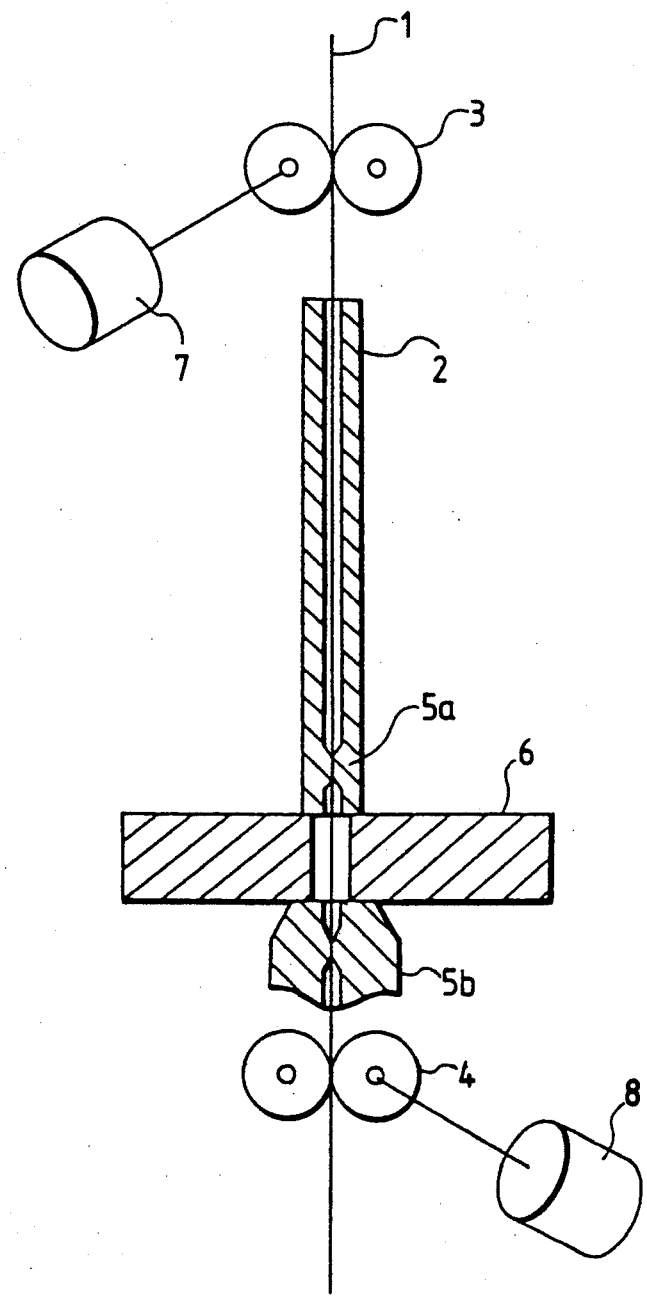
FIG. 12 is a diagram showing the arrangement of a conventional wire electrode feeding device.

FIG. 1 is a diagram showing the arrangement of a first example of a wire electrode feeding device according to the invention, and FIG. 2 is an enlarged view showing essential components of the device. In FIGS. 1 and 2, those components which have been already described with reference to FIG. 12 are therefore designated by the same reference numerals or characters. In FIGS. 1 and 2, the wire electrode 1 is made of a magnetic material such as iron. A coil assembly 9 is wound on the pipe guide 2. A current supplying means 10 is provided to supply AC current to the coil assembly 9.

In the wire electrode feeding device, the wire electrode 1 is fed not only by the drive force of the rollers 3 but also by supplying current to the coil assembly 9. This will be described with reference to FIG. 2 in more detail.

As shown in FIG. 2, three different coils 9a, 9b and 9c are wound repeatedly on the pipe guide 2 in the stated order from top. That is, the coil assembly 9 is made up of the three different coils 9a, 9b and 9c, thus forming three electrical circuits. The coils 9a, 9b and 9c are connected to current sources 10a, 10b and 10c, respectively.

The three current sources 10a, 10b and 10c supply AC currents to the coils 9a, 9b and 9c, respectively, which are equal in frequency and in amplitude to one another. The currents $I_1$, $I_2$ and $I_3$ are equally shifted in phase from one another in the stated order.

The current sources 10a, 10b and 10c form a current supplying means 10. When the coils 9a, 9b and 9c are energized by the current supplying means 10, AC magnetic fields $B_1$, $B_2$ and $B_3$ are produced along the central axes of the coils 9a, 9b and 9c, respectively. The AC magnetic fields $B_1$, $B_2$ and $B_3$ are also shifted in phase from one another. Therefore, a shifting magnetic field is induced, as a whole, along the central axis of the coil assembly 9 in the direction of movement of the wire electrode 1. In FIG. 2, reference numeral 11 designates the direction of movement of the shifting magnetic field.

Hence, the wire electrode of magnetic material disposed along the central axis of the oil assembly 9 is driven in the direction of movement 11 of the shifting magnetic field; that is, it is moved downwardly in FIG. 2.

Figure 3:
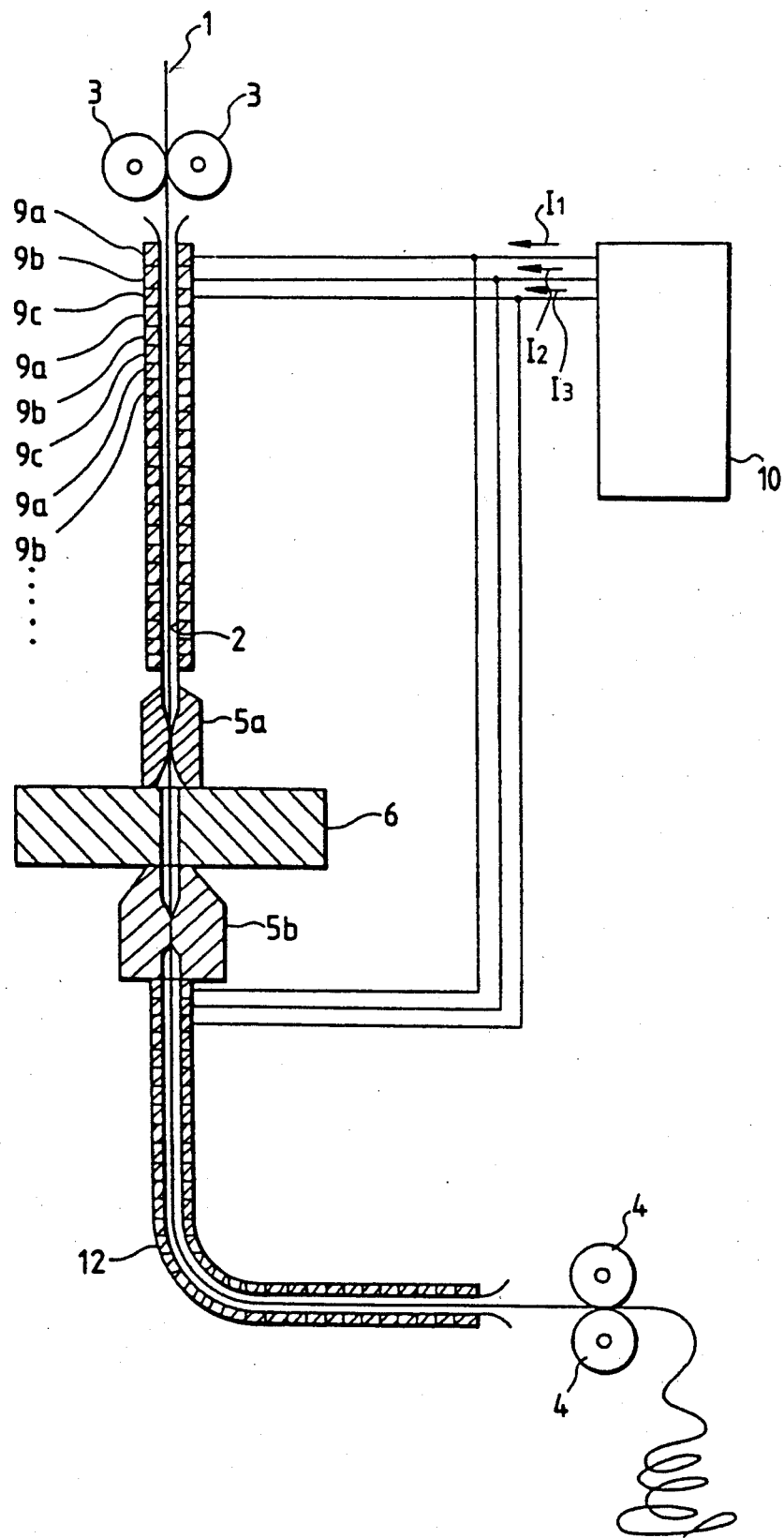
FIG. 3 is a diagram showing the arrangement of another example of the wire electrode feeding device according to the invention.
Figure 4:
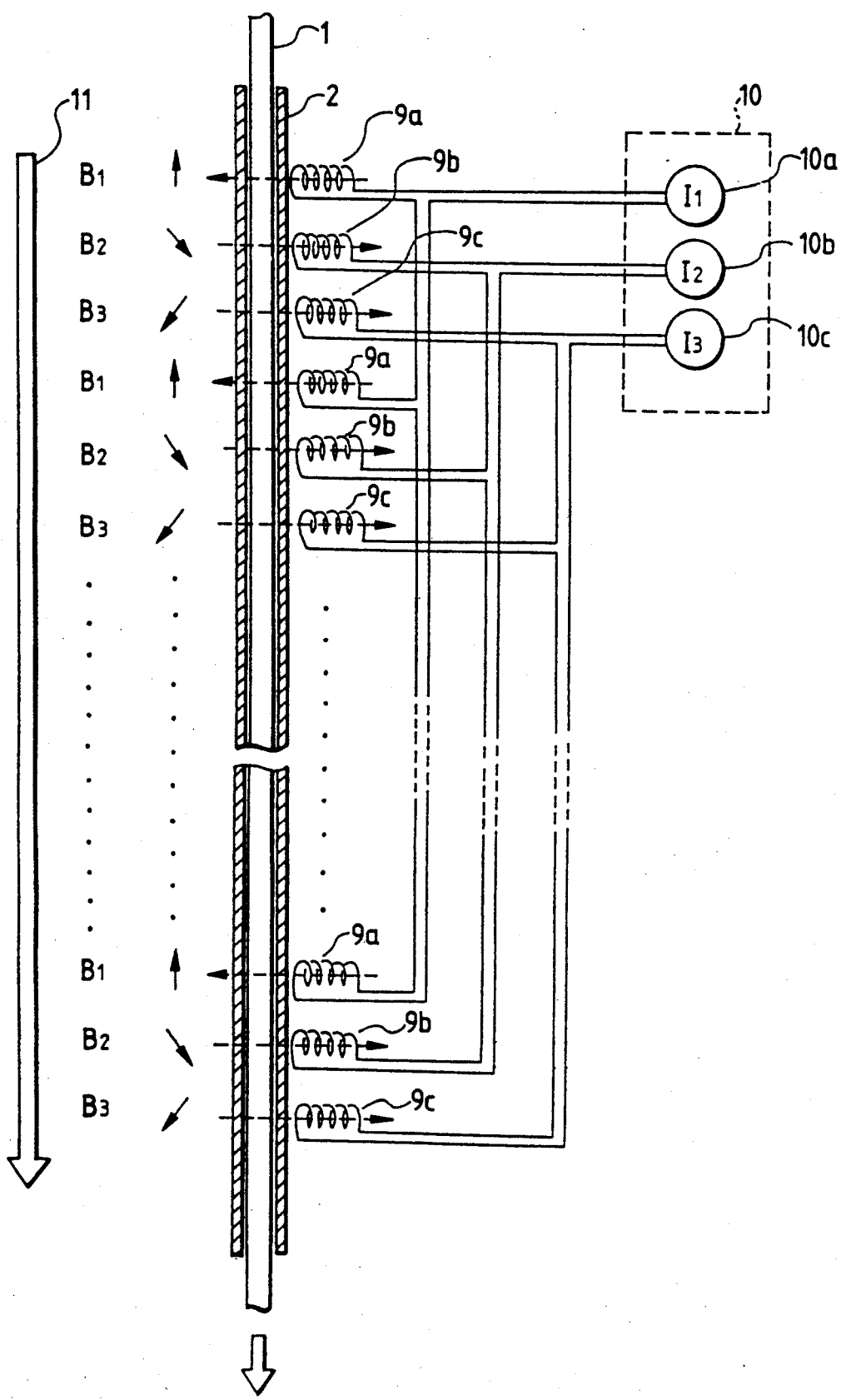
FIG. 4 is an enlarged view showing essential components of the device shown in FIG. 3.

FIG. 3 is a diagram showing the arrangement of a second example of the wire electrode feeding device according to the invention, and FIG. 4 is an enlarged diagram showing essential components of the device. In the device shown, the coils 9a, 9b and 9c forming three electrical circuits in the device shown in FIGS. 1 and 2 are so positioned that they produce magnetic fields perpendicular to the direction of insertion of the wire electrode. The direction of movement 11 of the shifting magnetic field, and the electromagnetic induction on the wire electrode 1 are the same as in the first example of the device described with reference to FIGS. 1 and 2.

In the above-described wire electrode feeding devices, the wire electrode 1 is made of magnetic material; however, it is not always necessary to use magnetic material to form the wire electrode, because electromagnetic induction acts on the wire electrode when current flows in it.

Furthermore in the above-described wire electrode feeding devices, the coil assembly 9 is divided into three electrical circuits; however, it should be noted that the invention is not limited thereto or thereby. That is, it may be divided into more than three electrical circuits. However, it is, in practice, suitable to divide it into three to six electrical circuits. And the phase difference between the AC currents should be determined according to the number of electrical circuits thus provided. In addition, the AC currents should be equally shifted in phase from one another. In the above-described devices, the coil assembly 9 is provided above the workpiece; however, the invention is not limited thereto or thereby. That is, it may be provided at any position where the wire electrode is increased as the coils are increased in number and in width. Therefore, the coils may be provided over the entire path of the wire electrode.

With the coil assembly 9 around the wire electrode 1, the latter 1 is driven by the magnetic field induced by the coil assembly. The force of driving the wire electrode 1 is applied to a small part of the wire electrode 1 in the coil assembly 9. The force being applied to the front end of the wire electrode 1, the drive source for the wire electrode 1 is increased from a point drive source, the pair of rollers 3, to a linear drive source. Thus, the drive system of the device according to the invention is suitable for driving a linear object such as a wire electrode.

As is apparent from the above description, the wire electrode 1 is smoothly driven in the pipe guide 2 independently of its diameter; that is, the automatic feeding of an extremely thin wire electrode can be positively achieved, whereby the unmanned operation of a wire cut electric discharge machine can be realized.

It is preferable that the wire electrode receiving end portion of the pipe guide is shaped in the form of a funnel so as to receive the wire electrode smoothly.

The middle portion 12 of the pipe guide 2 can be readily bent. The bending of the pipe guide will never adversely affect the force of driving the wire electrode. Therefore, the wire electrode 1 can be laid even in a small space.

Figure 5:
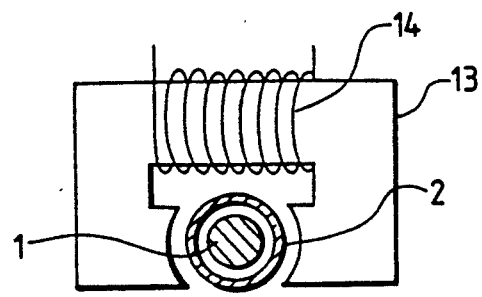
FIGS. 5 and 6 are a horizontal sectional view and a vertical sectional view of a pipe guide, respectively, showing a concrete example of magnetic field generating coils.
Figure 6:
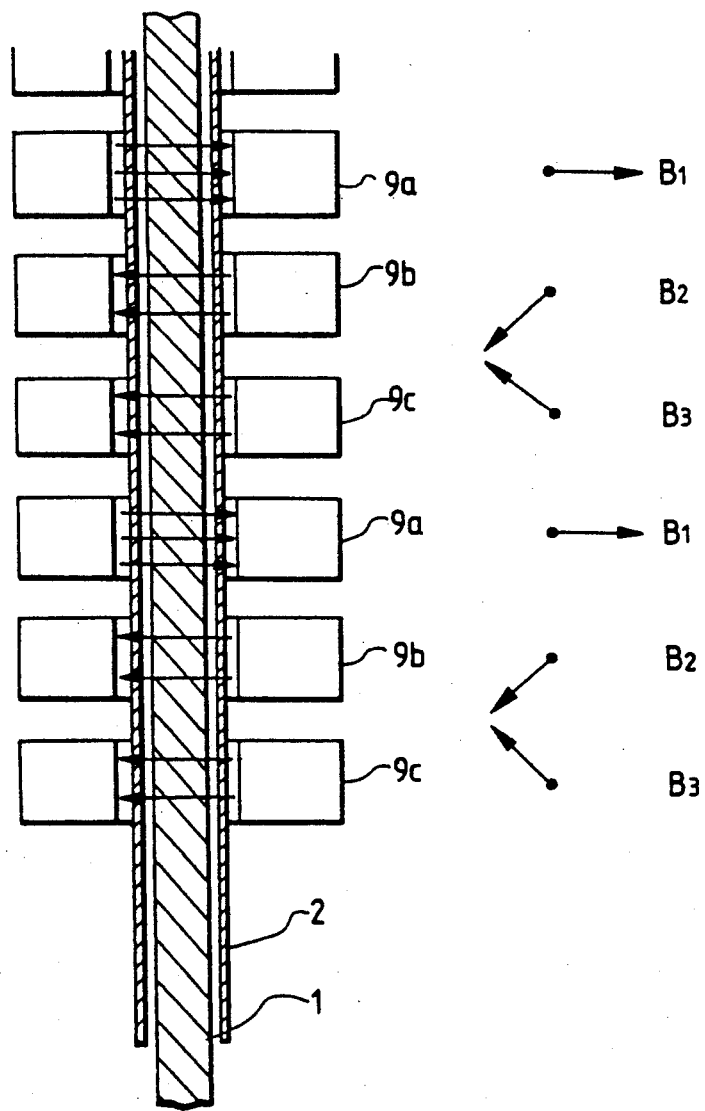

FIGS. 5 and 6 are a horizontal sectional view and a vertical sectional view of the pipe guide, respectively, for a description of the structure of the magnetic field generating coils. In FIGS. 5 and 6, reference numerals 13 designates U-shaped iron cores forming magnetic paths. Coils 14 are wound on the iron cores 13, respectively.

The U-shaped iron cores 13 are juxtaposed along the axis of the pipe guide 2 in such a manner that the pipe guide 2 is held between the legs of the U-shaped iron cores 13. The coils 14 wound on the U-shaped iron cores 13 are the magnetic field generating coils 9a, 9b and 9c, in which the leakage of magnetic flux is prevented.

Each of the coils 14 is relatively bulky. Therefore, it is limited to some extent to decrease the distance between the coils and to miniaturize the device itself.

Figure 7:
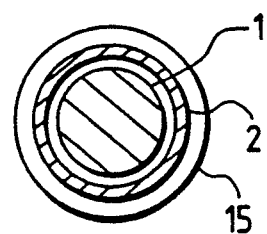
FIGS. 7 and 8 are a horizontal sectional view and a vertical sectional view of the pipe guide, respectively, showing another example of the magnetic field generating coils.
Figure 8:
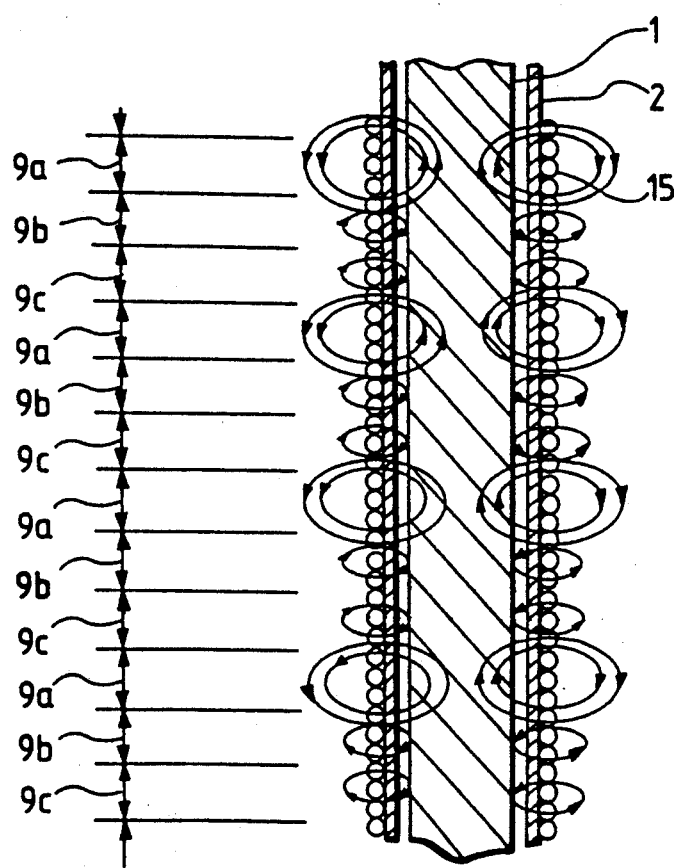

FIGS. 7 and 8 are horizontal sectional view and a vertical sectional view of the pipe guide 2, for a description of the structure of another example of the magnetic field generating coils. A solenoid coil 15 is wound on the pipe guide 2, and parts of the solenoid coil 15 are used as the magnetic field generating coils 9a, 9b and 9c.

In general, with the solenoid coil arranged as described above, a magnetic filed is produced in the direction of insertion of the wire electrode 1 and changed, as a result of which no driving force is generated in the direction of the insertion of the wire electrode 1 (in the direction of run of the wire electrode).

However, when, with a small solenoid coil wound around one and the same axis, the AC currents are shifted in phase from one another, the parts of the coil where no current flows become magnetic paths as illustrated, so that the magnetic flux induced goes across the wire electrode. As the magnetic flux changes, a force of driving the wire electrode in the direction of run thereof is produced.

In this example, the coil 15 is merely wound on the pipe guide; that is, the structure is simple. Therefore, the magnetic field generating field generating coils 9a, 9b and 9c can be made extremely small, and the ampere-turn can be increased. Thus, a great driving force can be produced. However, if the outside diameter of the wire electrode 1 is relatively small with respect to the inside diameter of the pipe guide 1, the magnetic flux across the wire electrode is extremely decreased, so that sometimes the wire electrode driving force produced is insufficient. In this case, the pipe guide 1 and the magnetic field generating coils 9a, 9b and 9c should be replaced with those which are designed for the outside diameter of the wire electrode 1.

Figure 9:
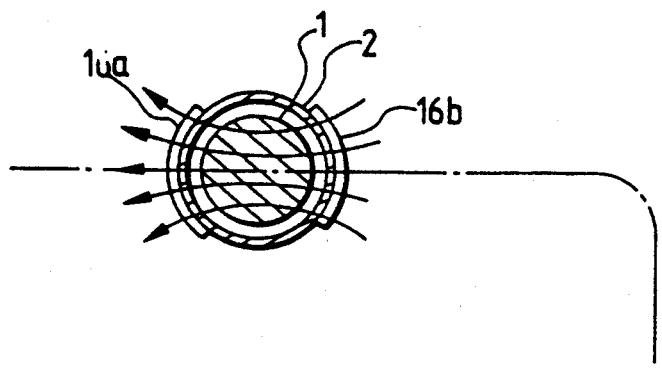
FIGS. 9, 10 and 11 are a horizontal sectional view, a vertical sectional view and a side view of the pipe guide, respectively, showing a further example of the magnetic field generating coils.
Figure 10:
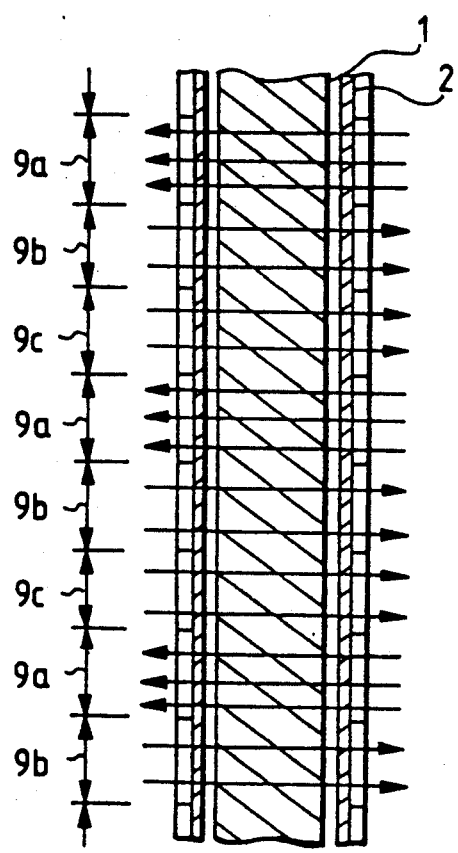
Figure 11:
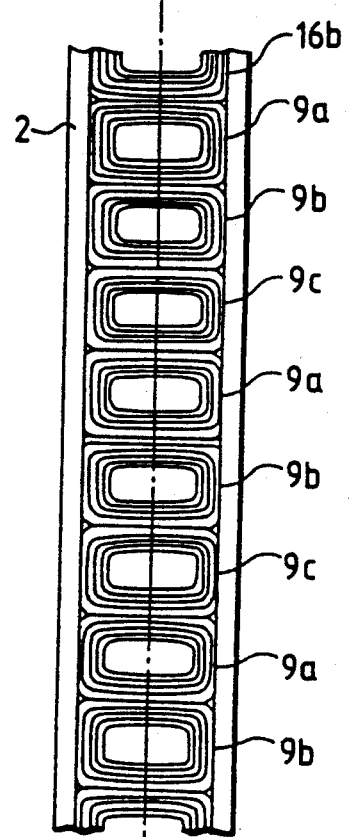

FIGS. 9, 10 and 11 are horizontal sectional view, a vertical sectional view, and a side view of the pipe guide 2, respectively, for a description of the structure of another example of the magnetic field generating coils. In this example, pairs of tape-shaped coils 16a and 16b formed by a photo chemical method such as photo etching are arranged on both sides of the pipe guide 2 into which the wire electrode 1 is inserted. Each pair of coils form one and the same magnetic flux, thus minimizing the leakage of magnetic flux. Although the coils are small, the ampere-turn is relatively large. Thus, generation of high magnetic flux and miniaturization of the device can be achieved at the same time. Accordingly, the wire electrode feeding device can be formed extremely small in size. Furthermore, with the device, the wire electrode driving force acts considerably near the workpiece. That is, the device is effective in driving a very thin wire electrode.

As was described above, in the wire electrode feeding device of the invention, the wire electrode is driven by electromagnetic induction. Therefore, the device is simple in structure having no movable part, and can produce a driving force high enough to drive a wire electrode irrespective of the diameter of the latter. Furthermore, with the device, the wire electrode will never be deformed; that is, even a very thin wire electrode can be safely and smoothly driven into the workpiece. Hence, the unmanned operation of a wire cut electric discharge machine can be readily realized according to the invention.

If the wire electrode is made of magnetic material, the leakage of magnetic flux is reduced. The magnetic field generating coils are wound on the pipe guide into which the wire electrode is inserted; that is, they can wound on the pipe guide with ease. The coils are wound around the wire electrode through the pipe guide, or are so provided that magnetic fields are formed perpendicular to the direction of insertion of the wire electrode. Therefore, the device is simple in structure, but it can produces a great force of driving the wire electrode. Furthermore, according to another aspect of the invention, pairs of magnetic field generating coils are employed in such a manner that each pair of magnetic field generating coils form one and the same magnetic flux, as a result of which the leakage of magnetic flux is minimized, and production of high magnetic flux and miniaturization of the device can be achieved at the same time.

INDUSTRIAL APPLICABILITY

This invention can be widely applied to the machining of a workpiece, such as a metal workpiece, with a wire cut electric discharge machine.

I claim:

1. In a wire cut electric discharge machine in which a wire electrode is allowed to penetrate a workpiece with a small gap therebetween, and while said wire electrode and said workpiece being moved relatively to each other along a machining locus, a machining voltage is applied across said wire electrode and said workpiece, so that said workpiece is machined with the electric discharge energy,
   a wire electrode feeding device, by comprising:
   a plurality of magnetic field generating coils arranged on a path along which said wire electrode is introduced into said workpiece; and
   current supplying means for supplying currents different in phase from one another to said magnetic fields generating coils,
   said wire electrode being driven by the electromagnetic induction caused by the shifting magnetic fields which are produced by said magnetic field generating coils.

2. A wire electrode feeding device as claimed in claim (1), in which said wire electrode is made of a magnetic material.

3. A wire electrode feeding device as claimed in claim (1), in which said magnetic field generating coils are wound on a pipe guide into which said wire electrode is inserted.

4. A wire electrode feeding device as claimed in claim (1), in which said magnetic field generating coils are wound coaxial with said wire electrode.

5. A wire electrode feeding device as claimed in claim (1), in which said magnetic field generating coils are so arranged as to generate magnetic fields perpendicular to the direction of insertion of said wire electrode.

6. A wire electrode feeding device as claimed in claim (1), in which said magnetic field generating coils are pair of magnetic field generating coils each pair of which form one and the same magnetic flux.

7. A wire electrode feeding device as claimed in claim (1), in which said magnetic field generating coils are tape-shaped magnetic field generating coils which are formed by a photo chemical method.

* * * * *